(12) United States Patent
Zhao et al.

(10) Patent No.: US 12,369,117 B2
(45) Date of Patent: Jul. 22, 2025

(54) METHOD AND APPARATUS FOR SENDING DOWNLINK CONTROL INFORMATION, AND METHOD AND APPARATUS FOR PROCESSING DOWNLINK CONTROL INFORMATION

(71) Applicant: DATANG MOBILE COMMUNICATIONS EQUIPMENT CO.,LTD., Beijing (CN)

(72) Inventors: Zheng Zhao, Beijing (CN); Meiying Yang, Beijing (CN); Jiaqing Wang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 809 days.

(21) Appl. No.: 17/600,089

(22) PCT Filed: Feb. 25, 2020

(86) PCT No.: PCT/CN2020/076606
§ 371 (c)(1),
(2) Date: Sep. 29, 2021

(87) PCT Pub. No.: WO2020/199791
PCT Pub. Date: Oct. 8, 2020

(65) Prior Publication Data
US 2022/0201607 A1    Jun. 23, 2022

(30) Foreign Application Priority Data
Mar. 29, 2019    (CN) .......................... 201910252162.7

(51) Int. Cl.
*H04W 52/02* (2009.01)
*H04W 72/23* (2023.01)

(52) U.S. Cl.
CPC ... *H04W 52/0219* (2013.01); *H04W 52/0229* (2013.01); *H04W 72/23* (2023.01)

(58) Field of Classification Search
CPC ............. H04W 72/23; H04W 52/0229; H04W 52/0216; H04W 52/0235; H04W 76/28;
(Continued)

(56) References Cited

U.S. PATENT DOCUMENTS

| | | |
|---|---|---|
| 2015/0092646 A1 | 4/2015 | Tabet et al. |
| 2018/0041997 A1 | 2/2018 | Babaei et al. |

(Continued)

FOREIGN PATENT DOCUMENTS

| | | |
|---|---|---|
| CN | 101646229 A | 2/2010 |
| CN | 101742626 A | 6/2010 |

(Continued)

OTHER PUBLICATIONS

CATT, "Further details of group-common control", 3GPP TSG RAN WG1 Meeting #88bis, Spokane, USA, Apr. 3-7, 2017, total 5 pages, R1-1704572.

(Continued)

*Primary Examiner* — Khalid W Shaheed
(74) *Attorney, Agent, or Firm* — KILPATRICK TOWNSEND & STOCKTON LLP (57) ABSTRACT

Disclosed are a method and apparatus for sending downlink control information, and a method and apparatus for processing downlink control information. The method for sending downlink control information provided in the present application includes: determining user group-common downlink control information (group-common DCI), and the group-common DCI is used to indicate energy conservation information of at least one terminal; and sending the group-common DCI to the terminal.

14 Claims, 3 Drawing Sheets

---

UE group-common DCI is received — S201

Energy conservation information is obtained from the group-common DCI and corresponding processing is performed according to the energy conservation information — S202

(58) Field of Classification Search
CPC ........... H04W 52/0219; H04W 52/028; H04W 52/0212; H04W 72/0453; H04W 48/12; H04W 24/10
See application file for complete search history.

(56) References Cited

U.S. PATENT DOCUMENTS

| | | | |
|---|---|---|---|
| 2018/0167920 A1 | | 6/2018 | Kim et al. |
| 2018/0279223 A1 | | 9/2018 | Kim et al. |
| 2020/0100183 A1 | * | 3/2020 | Jose .................. H04W 72/23 |

FOREIGN PATENT DOCUMENTS

| | | | | |
|---|---|---|---|---|
| CN | 102315870 A | | 1/2012 | |
| CN | 102461053 A | | 5/2012 | |
| CN | 103650596 A | | 3/2014 | |
| CN | 104054364 A | | 9/2014 | |
| CN | 106686740 A | | 5/2017 | |
| CN | 107592961 A | | 1/2018 | |
| CN | 108811156 A | | 11/2018 | |
| CN | 109286966 A | | 1/2019 | |
| CN | 109474385 A | | 3/2019 | |
| CN | 111356213 A | | 6/2020 | |
| CN | 113273255 A | | 8/2021 | |
| CN | 113812185 A | | 12/2021 | |
| EP | 3809762 A1 | | 4/2021 | |
| EP | 3902335 A1 | | 10/2021 | |
| RU | 2638570 C1 | * | 12/2017 | ........ H04W 52/0216 |
| WO | 2018103558 A1 | | 6/2018 | |
| WO | 2018196857 A1 | | 11/2018 | |
| WO | 2018205874 A1 | | 11/2018 | |
| WO | 2019037119 A1 | | 2/2019 | |
| WO | WO-2020125369 A1 | * | 6/2020 | ......... H04L 27/2602 |

OTHER PUBLICATIONS

Apple Inc., "Control Information for UE Power Saving1", 3GPP TSG-RAN WG1 Meeting NR#3, Nagoya, Japan, Sep. 18-21, 2017, total 6 pages, R1-1716553.

Samsung, "On UE Power Savings", 3GPP TSG RAN WG1 Meeting #92, Athens, Greece, Feb. 26-Mar. 2, 2018, total 5 pages, R1-1801977.

3GPP TR 38.840 V1.0.0, 3rd Generation Partnership Project; Technical Specification Group Radio Access Network; NR;Study on UE Power Saving (Release 16), total 13 pages, Mar. 2019.

Apple Inc., "On DL signals for NR-U", 3GPP TSG RAN WG1 #96, Athens, Greece, Feb. 25-Mar. 1, 2019, total 6 pages, R1-1902759.

Qualcomm Incorporated, "Potential Techniques for UE Power Saving", 3GPP TSG-RAN WG1 #96, Athens, Greece, Feb. 25-Mar. 1, 2019, total 33 pages, R1-1903016.

Apple Inc., "Control Indicator in Group-common PDCCH for UE Power Saving", 3GPP TSG-RAN WG1 NR#2, Qingdao, China, Jun. 27-30, 2017, total 5 pages, R1-1710907.

CATT,"[89-20] email discussion: Group-common PDCCH for NR", 3GPP TSG RAN WG1 Meeting #AH_NR2, Qingdao, P. R. China, Jun. 27-30, 2017, total 22 pages, R1-1710968.

* cited by examiner

METHOD AND APPARATUS FOR SENDING DOWNLINK CONTROL INFORMATION, AND METHOD AND APPARATUS FOR PROCESSING DOWNLINK CONTROL INFORMATION

CROSS-REFERENCE TO RELATED APPLICATIONS

The present application is a US National Stage of International Application No. PCT/CN2020/076606, filed on Feb. 25, 2020, which claims the priority of the Chinese patent application No. 201910252162.7 filed to the China Patent Office on Mar. 29, 2019, and entitled "Method and Apparatus for Sending Downlink Control Information, and Method and Apparatus for Processing Downlink Control Information", of which the entire contents are incorporated herein by reference.

FIELD

The present application relates to the field of communication, in particular to a method and apparatus for sending downlink control information (DCI), and a method and apparatus for processing downlink control information.

BACKGROUND

In a new radio (NR) technology system, a user needs to monitor a physical downlink control channel (PDCCH) monitor occasion configured in all time slots when the user is in a connected state. However, in most of the PDCCH monitor occasions, these PDCCH monitors are unnecessary if a base station does not send the PDCCH, and these PDCCH monitors will consume terminal energy in vain due to the fact that the user needs to consume power to perform PDCCH monitoring.

In an NR, connected mode discontinuous reception (C-DRX) data of a long term evolution (LTE) system is counted, and as shown in the following Table 1, there is no data in an LTE C-DRX period in most cases.

TABLE 1

Statistic analysis based on LTE C-DRX logarithm data.

| App | Proportion accounted by a DRX period without scheduling $N_{DRX\text{-}cycleswithoutscheduling}/N_{totalDRX\text{-}cycles}$ |
|---|---|
| Video stream | 89% |
| Audio stream | 90% |
| Web browsing | 71% |

It can be seen from Table 1 that in the DRX period, there is no data scheduling in most cases. The user will perform PDCCH monitoring during DRX On duration. The user can be made to fall into a deep sleep in these DRX periods. When the user is in the deep sleep, power consumed by the user is smaller than one percent of power consumption for PDCCH monitoring.

Because whether there is data scheduling in each DRX period changes dynamically, a base station cannot indicate whether there is the data in each DRX period through a high-level signaling, and the base station can indicate whether there is the data in the DRX period through the PDCCH of a physical layer or a signal. It needs to indicate whether current DRX needs to be subjected to PDCCH monitoring or not for each user, and PDCCH resource waste will be caused due to the fact that one PDCCH bears one bit of data.

SUMMARY

Embodiments of the present application provide a method and apparatus for sending downlink control information, and a method and apparatus for processing downlink control information, which are used to give, via DCI based on a user group, a notification of energy conservation information of the user group, increasing the utilization rate of resources and guaranteeing the flexibility of scheduling by a base station.

At a network side, for example, at a base station side, a method for sending DCI provided by an embodiment of the present application, includes:
  determining user equipment (UE) group-common DCI, where the group-common DCI is used for indicating energy conservation information of at least one UE; and
  sending the group-common DCI to the at least one UE.

Through the method, the group-common DCI is determined, where the group-common DCI is used for indicating the energy conservation information of at least one terminal; and the group-common DCI is sent to the terminal, thus the utilization rate of the resources is increased, and the flexibility of scheduling by the base station is guaranteed.

In one embodiment, the energy conservation information includes one or a combination of following contents:
  whether to wake up to monitor a PDCCH;
  whether to be dormant and not monitor the PDCCH;
  whether to monitor F PDCCH time cells, where F is a positive integer greater than or equal to 1;
  whether to skip monitoring of G PDCCH time cells, where G is a positive integer greater than or equal to 1;
  whether to switch a bandwidth part (BWP);
  whether to activate or deactivate a carrier;
  whether to configure a dormant secondary cell (Scell);
  whether to configure a DRX parameter set;
  whether to configure PDCCH decoding energy conservation information;
  whether to configure a radio resource management (RRM) energy conservation function; and
  whether to trigger at least one of reference signal sending or relevant measurement information reporting.

In one embodiment, for different UEs or UE groups, the energy conservation information is configured respectively.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or the UE corresponding group corresponding to the bits.

In one embodiment, a format of the group-common DCI is scrambled through at least one radio network temporary identity (RNTI).

In one embodiment, the RNTI is a newly-defined RNTI or multiplexing of an existing RNTI.

In one embodiment, the existing RNTI is a slot format indication radio network temporary identity (SFI-RNTI); DCI which carries the energy conservation information and is indicated by the SFI-RNTI is SFI-DCI; and the SFI-DCI is indicated based on an SFI DCI reserved bit, or indicated based on a bit used by SFI.

Accordingly, at a terminal side, a method for processing DCI provided by an embodiment of the present application, includes:

receiving UE group-common DCI; and obtaining energy conservation information from the group-common DCI and performing corresponding processing according to the energy conservation information.

In one embodiment, the energy conservation information includes one or a combination of following contents:

whether to wake up to monitor a PDCCH;

whether to be dormant and not monitor the PDCCH;

whether to monitor F PDCCH time cells, where F is a positive integer greater than or equal to 1;

whether to skip monitoring of G PDCCH time cells, where G is a positive integer greater than or equal to 1;

whether to switch a BWP;

whether to activate or deactivate a carrier;

whether to configure a dormant secondary cell;

whether to configure a DRX parameter set;

whether to configure PDCCH decoding energy conservation information;

whether to configure an RRM energy conservation function; and whether to trigger at least one of reference signal sending or relevant measurement information reporting.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or a corresponding UE group corresponding to the bits.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI; DCI which carries the energy conservation information and is indicated by the SFI-RNTI is SFI-DCI; and the SFI-DCI is indicated based on an SFI DCI reserved bit, or indicated based on a bit used by SFI.

At a network side, an apparatus for sending DCI provided by an embodiment of the present application includes:

a memory, configured to store a program instruction; and a processor, configured to call the program instruction stored in the memory, and execute according to an obtained program:

determining UE group-common DCI, where the group-common DCI is used for indicating energy conservation information of at least one UE; and sending the group-common DCI to the at least one UE.

In one embodiment, the energy conservation information includes one or a combination of following contents:

whether to wake up to monitor a PDCCH;

whether to be dormant and not monitor the PDCCH;

whether to monitor F PDCCH time cells, where F is a positive integer greater than or equal to 1;

whether to skip monitoring of G PDCCH time cells, where G is a positive integer greater than or equal to 1;

whether to switch a BWP;

whether to activate or deactivate a carrier;

whether to configure a dormant secondary cell;

whether to configure a DRX parameter set;

whether to configure PDCCH decoding energy conservation information;

whether to configure an RRM energy conservation function; and whether to trigger at least one of reference signal sending or relevant measurement information reporting.

In one embodiment, for different UEs or UE groups, the energy conservation information is configured respectively.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or a corresponding UE group corresponding to the bits.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI; DCI which carries the energy conservation information and is indicated by the SFI-RNTI is SFI-DCI; and the SFI-DCI is indicated based on an SFI DCI reserved bit, or indicated based on a bit used by SFI.

At a terminal side, an apparatus for processing DCI provided by an embodiment of the present application, includes:

a memory, configured to store a program instruction; and a processor, configured to call the program instruction stored in the memory, and execute according to an obtained program:

receiving UE group-common DCI; and obtaining energy conservation information from the group-common DCI and performing corresponding processing according to the energy conservation information.

In one embodiment, the energy conservation information includes one or a combination of following contents:

whether to wake up to monitor a PDCCH;

whether to be dormant and not monitor the PDCCH;

whether to monitor F PDCCH time cells, where F is a positive integer greater than or equal to 1;

whether to skip monitoring of G PDCCH time cells, where G is a positive integer greater than or equal to 1;

whether to switch a BWP;

whether to activate or deactivate a carrier;

whether to configure a dormant secondary cell;

whether to configure a DRX parameter set;

whether to configure PDCCH decoding energy conservation information;

whether to configure an RRM energy conservation function; and whether to trigger at least one of reference signal sending or relevant measurement information reporting.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or a corresponding UE group corresponding to the bits.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI;
DCI which carries the energy conservation information and is indicated by the SFI-RNTI is SFI-DCI; and
the SFI-DCI is indicated based on an SFI DCI reserved bit, or indicated based on a bit used by SFI.

At a network side, another apparatus for sending DCI provided by an embodiment of the present application, includes:
a determining device, configured to determine UE group-common DCI, where the group-common DCI is used for indicating energy conservation information of at least one UE; and
a sending device, configured to send the group-common DCI to the at least one UE.

At a terminal side, another apparatus for processing DCI provided by an embodiment of the present application, includes:
a receiving device, configured to receive UE group-common DCI; and
a processing device, configured to obtain energy conservation information from the group-common DCI and perform corresponding processing according to the energy conservation information.

Another embodiment of the present application provides a computing device, including a memory and a processor, where the memory is used to store a program instruction, and the processor is used to call the program instruction stored in the memory, and execute any one of the above methods according to an obtained program.

A further embodiment of the present application provides a computer storage medium. The computer storage medium stores a computer executable instruction, and the computer executable instruction is used to cause a computer to execute any one of the above methods.

BRIEF DESCRIPTION OF THE DRAWINGS

In order to illustrate the embodiments of the present application more clearly, the drawings needing to be used in description of the embodiments will be briefly introduced below.

DETAILED DESCRIPTION OF THE EMBODIMENTS

The embodiments of the present application will be described below clearly and completely with reference to the drawings in the embodiments of the present application. The described embodiments are only part of the embodiments of the present application, but not all the embodiments.

Embodiments of the present application provide a method and apparatus for sending downlink control information, and a method and apparatus for processing downlink control information, which are used to give a notification of energy conservation information of the user group via user group-common downlink control information (DCI), increasing the utilization rate of resources and guaranteeing the flexibility of scheduling by a base station.

The methods and the apparatuses are based on the same application concept. The principles for solving the problems by the methods and the apparatuses are similar, and thus implementation of the apparatuses and the methods may refer to each other, which are not repeated any more.

The embodiments of the present application may be applicable to various systems, especially a 5G system. For example, the applicable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD), a universal mobile telecommunication system (UMTS), a worldwide interoperability for microwave access (WiMAX) system, the 5G system, a 5G NR system and so on. Each of the various systems includes a terminal device and a network device.

The terminal device involved in the embodiments of the present application may be a device pointing to a user to provide at least one of piece of voice or data connectivity, a handheld device having a radio connecting function, or other processing devices connected to a radio modem. Names of the terminal device may also be different in the different systems, for example, in the 5G system, the terminal device may be referred to as user equipment (UE). The radio terminal device may be in communication with one or more core networks through a radio access network (RAN). The radio terminal device may be a mobile terminal device, such as a mobile telephone (or referred to as a "cellular" telephone) and a computer having a mobile terminal device, for example, a portable mobile apparatus, a pocket mobile apparatus, a handheld mobile apparatus, a computer built-in mobile apparatus or a vehicle-mounted mobile apparatus, which exchange at least one of piece of language or data with the radio access network. The radio terminal device may be a device such as a personal communication service (PCS) telephone, a cordless telephone, a session initiated protocol (SIP) phone, a wireless local loop (WLL) station, a personal digital assistant (PDA) and the like. The radio terminal device may also be referred to a system, a subscriber device, a subscriber station, a mobile station, a mobile, a remote station, an access point, a remote terminal, an access terminal, a user terminal, a user agent and a user device, which are not limited in the embodiments of the present application.

The network device involved in the embodiments of the present application may be a base station which may include a plurality of cells. According to different specific application scenarios, the base station may also be referred to as an access point, or may refer to a device in communication with the radio terminal device on an air interface in an access network through one or more sectors, or other names. The network device may be used to perform interconversion on a received air frame and internet protocol (IP) grouping and serve as a router between the radio terminal device and the rest part of the access network, where the rest part of the access network may include an IP communication network. The network device can further coordinate attribute management on the air interface. For example, the network device involved in the embodiments of the present application may be a network device (a base transceiver station, BTS) in a global system for mobile communications (GSM) or code division multiple access (CDMA), or a network device (NodeB) in wide-band code division multiple access (WCDMA), or an evolutional network device (evolutional node B, eNB or e-NodeB) in a long term evolution (LTE) system, a 5G base station in a 5G network architecture (next generation system), or a home evolved node B (HeNB), a relay node, a femto, a pico and so on, which is not limited in the embodiments of the present application.

All the embodiments of the present application are described below in detail with reference to the drawings of the specification. It should be noted that the display order of the embodiments of the present application only represent the sequential order of the embodiments rather than superiority and inferiority of the solutions provided by the embodiments.

An embodiment of the present application provides DCI based on a user group, which may indicate energy conservation information such as performing PDCCH monitoring in a corresponding DRX period by users in the user group. The DCI may be referred to as power saving DCI (PS-DCI) below, guaranteeing the flexibility of scheduling by a base station while increasing the utilization rate of resources.

In the embodiment of the present application, the base station indicates at least one energy conservation information field of at least one terminal by configuring a new group-common DCI and/or multiplexing existing group-common DCI. The information field may include M user groups, where M is a positive integer greater than or equal to 1; and each user group includes N variable bits, that is to say, the number of bits of each information field is variable, where N is a positive integer greater than or equal to 1. A DCI format is scrambled through at least one newly-defined radio network temporary identity (RNTI) and/or an existing RNTI. The multiplexed existing group-common DCI may be slot format indication (SFI) group-common DCI; and SFI may multiplex at least one of a reserved bit, or implicit indication energy conservation information of D, U or X type. D represents downlink transmission, U represents uplink transmission, and X represents that a transmission direction may include uplink or downlink.

Through the method, the base station can define a new DCI format and new RNTI scrambling to indicate energy conservation information configuration of a terminal; or by adopting the existing RNTI, a bit field of the energy conservation information is carried on an existing DCI format, to enable UE to achieve the energy conservation.

The embodiments of the present application will be introduced below at a base station side and a terminal side respectively.

Figure 1:
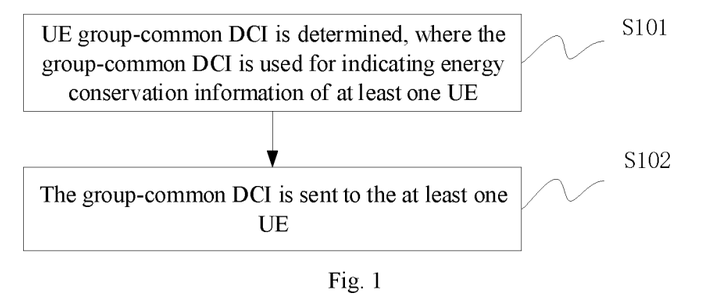
FIG. 1 is a schematic flow diagram of a method for sending downlink control information at a network side provided by an embodiment of the present application.

At the network side, referring to FIG. 1, for example in a base station side, a method for sending downlink control information provided by an embodiment of the present application, includes the following.

S101, UE group-common DCI is determined, where the group-common DCI is used for indicating energy conservation information of at least one UE.

In the embodiment of the present application, new group-common DCI is defined to indicate at least one terminal, for example, at least one piece of energy conservation information of the UE.

The group-common DCI may also be expressed as group-common PS-DCI or simply expressed as PS-DCI hereinafter.

S102, the group-common DCI is sent to the at least one UE.

Through the method, the UE group-common DCI is determined, where the group-common DCI is used for indicating the energy conservation information of at least one terminal. The group-common DCI is sent to the terminal, thus the utilization rate of the resources is increased, and the flexibility of scheduling by the base station is guaranteed.

In one embodiment, the energy conservation information includes one or a combination of following contents:
  whether to wake up to monitor a PDCCH;
  whether to be dormant and not monitor the PDCCH;
  whether to monitor F PDCCH time cells, where F is a positive integer greater than or equal to 1;
  whether to skip monitoring of G PDCCH time cells, where G is a positive integer greater than or equal to 1;
  whether to switch the BWP;
  whether to activate or deactivate a carrier;
  whether to configure a dormant secondary cell;
  whether to configure a DRX parameter set;
  whether to configure PDCCH decoding energy conservation information;
  whether to configure an RRM energy conservation function; and
  whether to trigger at least one of reference signal sending or relevant measurement information reporting.

In one embodiment, for different UEs, the energy conservation information can be configured respectively.

The user in the embodiment of the present applications may refer to the terminal, such as the UE and so on.

In one embodiment, the group-common DCI includes M quantity of UEs or UE groups, where M is a positive integer greater than or equal to 1. Each UE group includes N variable bits, where N is a positive integer greater than or equal to 1.

In one embodiment, the bits are used for identifying the energy conservation information of the UE(s) of the UE group or the UE group in the time corresponding to the bits.

The time corresponding to the bits is determined according to standard regulation.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI;
  DCI which carries the energy conservation information and is indicated by the SFI-RNTI is SFI-DCI; and
  the SFI-DCI is indicated based on an SFI DCI reserved bit, or indicated based on a bit used by SFI.

As for indication based on the bit used by the SFI, when the slot format of a corresponding time-frequency resource is indicated by the SFI field is indicated as X, it shows that the user is in an energy conservation state in a corresponding time frequency unit.

For example, the following steps are executed in the base station side.

Step 1: the base station determines the user group and obtains scheduling information of each user in the user group in a DRX period.

How to group and how to schedule the users specifically may be set according to specific needs, which is not limited in the embodiment of the present application.

The users in the same group may share one piece of group-common PS-DCI.

The DRX periods and the starting points of DRX On duration of all the users in the same group may be different or the same.

Step 2: the base station configures at least one of PDCCH parameters bearing PS-DCI of each user, or indication parameters borne by the PS-DCI of each user. The indication parameters borne by the PS-DCI include specific PDCCH monitor occasions, where specific PDCCHs may refer to PDCCHs except for PDCCHs bearing the PS-DCI, or all PDCCHs including the PS-DCI, or one kind or several kinds of PDCCHs; or search spaces and time frequency resources of the specific PDCCHs; and/or the PS-DCI group identifiers, where the PS-DCI group identifier may be expressed through the RNTI; and/or user power saving field corresponding bits and contents.

Here, the user power saving field corresponding bit may be the situations that each user corresponds to one bit in the DCI or each user corresponds to a plurality of bits, each user corresponds to one information field or a plurality of information fields, the information field can be shared by the different users or only aimed at one user, that is to say, each user group includes the N variable bits, where N is a positive integer greater than or equal to 1, and the different users may have different N values. Meaning of each bit may be standardly predefined, or the meaning indicated by each user power saving bit may be configured through a high-level signaling. The information field may indicate whether a user is woken or slept, and may further indicate frequency field activating after waking, configuration of time field PDCCH monitoring, and space field wave beam management related contents. The information field may further be indicated through the SFI; and in NR, a time slot structure is indicated through the SFI. The embodiment of the present application indicates the waking or sleeping situation through the SFI, which less modifies the standard, and the objective of electricity saving is achieved.

Here, when the PS-DCI group identifier is expressed through the RNTI, the RNTI may be at least one of the newly-defined RNTI or existing RNTI scrambling.

Here, the PDCCH parameters bearing the PS-DCI may include configuration of PDCCH resources bearing the PS-DCI and a surveillance occasion.

Step 3: the base station sends the PS-DCI on the PDCCH resources bearing the PS-DCI.

Here, it may be configured that the PS-DCI is sent at the starting point of DRX On duration, or in DRX Off duration. Here, the sleep refers to DRX Off duration, MAC CE indicates the user sleep, or the user falls asleep when an OnDuration counter reaches a set value, or the user falls asleep when an InActivity counter reaches a set value.

The PS-DCI may be sent in the DRX On duration or DRX Off duration. When the PS-DCI is in DRX Off duration, the PS-DCI indicates the PDCCH monitoring and/or sleep situation, and/or the measuring situation of the next DRX On duration.

Information indicated by the PS-DCI may further include information used for indicating time offset of the position of PDCCH needing to be monitored relative to the current PS-DCI position, but the method should not influence the starting time of the OnDuration counter.

The PS-DCI may further include information used for indicating selection of the PDCCH monitor occasion and used for indicating that the PDCCH monitor occasion is further selected on original monitor occasion configured by a high layer signaling. The PDCCH monitor occasion refers to that the user performs PDCCH monitoring only on the monitor occasion. It may be indicated through a bit mapping mode. Bit mapping refers to that each user/all the users/part of users have one or more dedicated bits to indicate power saving information; or a table is preset to list patterns of various PDCCH monitor occasions. The base station indicates serial numbers of the patterns in the table to the terminal, so that the terminal can determine the pattern corresponding to the serial number according to the preset table, thereby further determining the PDCCH monitor occasion needing to be selected.

Figure 2:
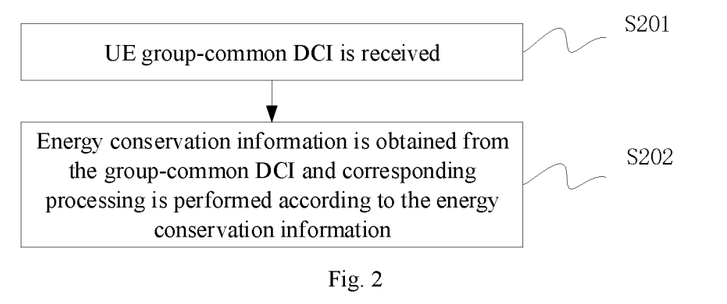
FIG. 2 is a schematic flow diagram of a method for processing downlink control information at a terminal side provided by an embodiment of the present application.

Accordingly, at a terminal side, referring to FIG. 2, a method for processing downlink control information provided by an embodiment of the present application, includes the following.

S201, UE group-common DCI is received.

S202, energy conservation information is obtained from the group-common DCI and corresponding processing is performed according to the energy conservation information.

In one embodiment, the energy conservation information includes one or a combination of following contents:
   whether to wake up to monitor a PDCCH;
   whether to be dormant and not monitor the PDCCH;
   whether to monitor F PDCCH time cells, where F is a positive integer greater than or equal to 1;
   whether to skip monitoring of G PDCCH time cells, where G is a positive integer greater than or equal to 1;
   whether to switch a BWP;
   whether to activate or deactivate a carrier;
   whether to configure a dormant secondary cell;
   whether to configure a DRX parameter set;
   whether to configure PDCCH decoding energy conservation information;
   whether to configure an RRM energy conservation function; and
   whether to trigger at least one of reference signal sending or relevant measurement information reporting.

Except for the above information, the energy conservation information may further be used for indicating other types of energy conservation information, which is not repeated here.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of the UE(s) of the UE group or the UE group corresponding to the bits. The time corresponding to the bits is determined according to standard regulation.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI; DCI which carries the energy conservation information and is indicated by the SFI-RNTI is SFI-DCI; and the SFI-DCI is indicated based on an SFI DCI reserved bit, or indicated based on a bit used by SFI.

For example, the following steps are executed at the terminal side.

Step 1, the terminal receives PDCCH parameters bearing the PS-DCI and configured by the base station, the terminal further receives and monitors the PS-DCI according to the PDCCH parameters bearing the PS-DCI, and obtains PDCCH monitor occasions, search spaces and time frequency resources, and/or PS-DCI group identification identifiers such as the corresponding RNTI, and/or field correspondence bits of PS-DCI corresponding to the user, and/or an acting range of the current PS-DCI.

Here, the acting range of the PS-DCI may be indicated by a high-level, or the PS-DCI acts in a non-sleep state in DRX, or the PS-DCI acts in a current PS-DCI period.

Step 2, the user judges whether PDCCH monitoring needs to be performed in a corresponding acting field according to the PS-DCI PDCCH parameters.

Here, when the DRX periods of all the users in any group are different, if the PS-DCI is sent on each beginning of DRX, each user only needs to receive the PS-DCI according to PS-DCI configuration of their own, and determines whether PDCCH monitoring needs to be performed according to the PS-DCI. After the user receives PS-DCI indicating the user to not perform PDCCH monitoring, the user does not perform PDCCH monitoring any more in the acting range of the PS-DCI. Or after the user receives PS-DCI indicating the user to fall asleep, the user falls asleep until the next DRX period. Or after the user receives PS-DCI indicating the user to perform PDCCH monitoring, the user performs PDCCH monitoring according to the time sequence of the DRX.

When the PS-DCI is in DRX Off duration, the PS-DCI indicates the PDCCH monitoring and sleep situation of next DRX On duration.

Several specific embodiments are given below respectively.

At a base station side.

Embodiment 1: New group-common DCI is defined to indicate at least one piece of energy conservation information of at least one UE.

Step 1: the base station configures user group information.

The base station configures at least one piece of user group information. For example, M quantity of user groups are configured, where M is a positive integer greater than or equal to 1, and one piece of user group information includes at least one UE.

Grouping of the at least one user group may be performed by the base station according to a certain criterion, which may be at least one of the followings: service characteristics of the UE, DRX parameter configuration, energy conservation configuration, quality of service (QOS) requirements, the QoS class identifier (QCI), and other grouping modes, which is not limited herein.

The DRX parameter configuration may include at least one of the followings: a DRX period, a DRX OnDuration timer, a DRX inactivity timer, and DRX offset; and at least one DRX parameter configuration is the same in one user group.

In one embodiment, configuring the user group information by the base station, further includes: configuring a bitmap of the user group information. The bitmap is used for indicating a trigger identifier of energy conservation information of each UE in the group. The number of users indicated by the bitmap may be the same or different from the number of user groups.

Specifically, when the number of users indicated by the bitmap is equal to the number of user groups, each bit can be mapped to energy conservation trigger information of one user group.

When the number of users indicated by the bitmap is greater than the number of user groups, each user group can be mapped to one bit in the bitmap, or a plurality of user groups can be mapped to one bit in the bitmap. The mapping relationship may be predetermined, or may be semi-statically configured, for example, the mapping relationship may be configured through a radio resource control (RRC) signaling or a media access control control element (MAC-CE).

A selection method for being mapped to one user group or the plurality of user groups may be predefined, or may be semi-statically configured, for example, be configured through an RRC signaling or an MAC-CE signaling.

Specifically, as shown in the following Table 2, when the number of users indicated by the bitmap is smaller than the number of user groups, each bit in the bitmap can be mapped to energy conservation trigger information of one user group, and can be mapped to energy conservation trigger information of the plurality of user groups. The mapping relationship may be predetermined, or may be semi-statically configured, for example, may be configured through the RRC signaling or MAC-CE. When being mapped to one user group, the selection method of the user group may be predefined, or may be semi-statically configured, for example, be configured through the RRC signaling or the MAC-CE signaling.

TABLE 2

| | All UE energy conservation trigger information bitmap | Each energy conservation bit field information | | | |
|---|---|---|---|---|---|
| 1) | 4bit indicates information of 4 energy conservation bit fields | UE1(3bit) | UE2(5bit) | UE3(1bit) | UE4(3bit) |
| 2) | 4bit indicates information of 2 energy conservation bit fields | UE1(3bit) | UE2(5bit) | | |
| | 4bit indicates information of 2 energy conservation bit fields | UE1/UE2(3bit) | UE3/UE4(5bit) | | |
| | 4bit indicates information of 2 energy conservation bit fields | UE1/UE2(3bit) | UE3/UE4(5bit) | | |
| | 4bit indicates information of 4 energy conservation bit fields | UE1/UE2/UE3(3bit) | UE4(5bit) | | |

TABLE 2-continued

| All UE energy conservation trigger information bitmap | Each energy conservation bit field information | | | | |
|---|---|---|---|---|---|
| 3) 4bit indicates information of 5 energy conservation bit fields One of bits is mapped into inform atioin of two energy conservation bit fields | UE1(3bit) | UE2(5bit) | UE3(1bit) | UE4(3bit) | UE5(5bit) |

Step 2: the base station configures at least one of a parameter of energy conservation information field borne by PS-DCI or a PDCCH parameter of each UE of each user group.

The PDCCH parameter may include at least one of the following: monitoring time field occasions; CORESET resource configuration; search space resource configuration; the PS-DCI group identifier, for example, the corresponding RNTI; the bit number of a DCI information field of each user; and configuration of the energy conservation information borne by the DCI information field of each user.

The parameter of the energy conservation information field of the PS-DCI may include at least one of the followings: whether to wake up to monitor a PDCCH, whether to be dormant and not monitor the PDCCH, whether to monitor F PDCCH time cells, whether to skip monitoring of G PDCCH time cells, whether to switch a BWP, whether to activate/deactivate a carrier, whether to configure a dormant secondary cell (Scell), whether to configure a DRX parameter set, whether to configure PDCCH decoding energy conservation information, whether to configure an RRM energy conservation function, and whether to trigger at least one of reference signal sending or relevant measurement information reporting.

The energy conservation information may be statically/semi-statically configured, or dynamically configured. The static/semi-static configuration may be configuration through a high-level signaling, for example, the RRC signaling and MAC-CE. Dynamic configuration may be configuration based on the DCI or MAC-CE.

The PDCCH parameters may be predefined or configured through a high-level signaling, such as at least one of the RRC signaling or MAC-CE; and the PDCCH parameters may be statically/semi-statically configured, or may be configured through a physical layer signal/signaling/channel, such as DCI, or may be dynamically configured.

The search space resource configuration may be configuration as a common search space (CSS).

The RNTI, may include at least one newly-defined RNTI sequence, different RNTI sequences are configured for each user group, and all UEs in each user group use the same RNTI sequence. The RNTI may be multiplexing of an existing group-common DCI RNTI, for example, may be at least one of SFI-RNTI, INT-RNTI (Interrupted RNTI), Transmit Power Control-Physical Uplink Shared Channel-RNTI (TPC-PUSCH-RNTI), TPC-Physical Uplink Control Channel-RNTI (TPC-PUCCH-RNTI) or TPC-Sounding Reference Signal-RNTI (TPC-SRS-RNTI).

As for configuration of the bit numbers of DCI information fields of M quantity of user groups, each user group may include N variable bits greater than or equal to 1, where N is a positive integer not smaller than 1. A value of N may be configured through a high-level signaling, specifically, may include at least one of the followings: different QoS configuration of the base station according to different groups of UEs, service characteristics, DRX parameter configuration, energy conservation configuration, QOS requirements, the QCI, and other configuration modes, which is not limited herein.

The N variable bits may indicate that all the users in the group share the bit field information, or indicate the energy conservation information of each user in the group. The details are as followed.

1) The following Table 3 may indicate that all the UEs in the group share the bit field information. Taking an example that the energy conservation information indicates the PDCCH monitor occasions, all the UEs in the group uniformly configures the energy conservation information according to contents indicated by the DCI after receiving energy conservation DCI indication, specifically, taking PDCCH monitoring as an example.

The energy conservation information may be configured according to the number of monitor occasions of PDCCH monitoring between two pieces of group-common PS-DCI, and/or be configured according to the skipped number of monitor occasions of PDCCH monitoring between the two pieces of group-common PS-DCI.

Each of the N bits represents that whether the UE performs PDCCH monitoring or skips PDCCH monitoring in the time cell corresponding to the bit.

The N may be equal to 1, which represents the positions of the monitor occasions between the two pieces of group-common PS-DCI, whether to monitor the PDCCH, and/or whether to skip PDCCH monitoring; or represents whether to activate monitoring of the PDCCH, and/or whether to deactivate monitoring of the PDCCH.

TABLE 3

| Bit field configuration example. | | | | | | | | | | | | | | | | | |
|---|---|---|---|---|---|---|---|---|---|---|---|---|---|---|---|---|---|
| DCI content | MD 1 | MD 2 | MD 3 | MD 1 | MD 2 | MD 3 | MD 4 | MD 5 | MD 6 | ... | MD 1 | MD 2 | MD 3 | MD 1 | MD 2 | MD 3 | MD 4 | MD 5 |
| Grouping | Bit field1 | | | Bit field2 | | | | | | | Bit fieldm | | | Bit fieldM | | | | |
| Bit number N of each group | N1 = 3 | | | N2 = 6 | | | | | | | N_m = 6 | | | N_M = 5 | | | | |

2) Referring to the following Table 4, the N variable bits may indicate energy conservation information configuration of each UE in the group. The energy conservation information of each UE may be the same or different, and the bit number of the energy conservation information of each UE may be the same or different. Taking an example that the energy conservation information indicates the PDCCH monitor occasions, all the UEs in the group uniformly configure the energy conservation information according to contents indicated by the DCI after receiving energy conservation DCI indication, specifically, taking the PDCCH monitor occasions as an example.

when the DCI is in the specific time, and/or configured into a specific value. For example, the DCI indicates that the time slot does not contain the downlink symbol, the user can enter into a sleep state after receiving the signaling, or only does not perform downlink PDCCH monitoring, and still performs measuring and uplink sending and feedback according to DCI indication of the time slot structure. Specifically,

TABLE 4

| Grouping serial number | Group1 | | | | | | | | | | | | | | | | |
|---|---|---|---|---|---|---|---|---|---|---|---|---|---|---|---|---|---|
| DCI information field | UE1 Bit field1 | | | | UE2 Bit field2 | | | | UEk Bit fieldk | | | | UEK Bit fieldK | | | | |
| DCI content | MD 1 | MD 2 | MD 3 | MD 1 | MD 2 | MD 3 | MD 4 | MD 5 | MD 6 | ... | MD 1 | MD 2 | MD 3 | MD 1 | MD 2 | MD 3 | MD 4 | MD 5 |
| Bit number N of each UE | N1 = 3 | | | | N2 = 6 | | | | | | N_k = 3 | | | N_K = 5 | | | | |

Based on the above, if the energy conservation information of each UE is different and the bit number of the energy conservation information of each UE is the same, the bit of the energy conservation information of each UE may be the same in a bit filling mode.

Step 3: the base station sends DCI carrying the energy conservation information.

The PDCCH monitoring positions of DCI carrying the energy conservation information are semi-statically configured through the RRC, may be sent in a uniform period mode, or sent in a nonuniform period mode.

Embodiment 2: the existing SFI group-common DCI is defined to indicate at least one piece of energy conservation information of at least one UE.

Step 1: a base station configures user group information.

Step 2: the base station configures at least one of a parameter of the energy conservation information field borne by PS-DCI or a PDCCH parameter of each UE of each user group.

The PS-DCI may include at least one existing RNTI of the group-common DCI, for example, may be at least one of SFI-RNTI, IT-RNTI, TPC-PUSCH-RNTI, TPC-PUCCH-RNTI or TPTC-SRS-RNTI.

Taking the SFI-RNTI as an example, SFI may be adopted to identify energy conservation information of a user group. Specifically, in NR, a PDCCH may be used to indicate a time slot structure, which may refer to 38.211. When a symbol is X, a communication direction of the symbol is a flexible direction, and a user does not perform PDCCH receiving and downlink measurement on the symbol. The PS-DCI based on the group may also utilize the DCI format, to configure the symbol not needing to be monitored and/or measured as a flexible symbol. If the group common DCI is used for indicating power consumption saving, when the user receives the PS-DCI, if the configured time slot structure does not contain a downlink symbol, the user may enter into a sleep state, or only does not perform downlink PDCCH monitoring and/or measuring, and still performs uplink sending and feedback according to the group common DCI indication for indicating the time slot structure. Specifically, whether to enter into a sleep state, or whether to perform measuring, or whether to perform uplink transmission may be configured by a high layer signaling.

The PS-DCI and the DCI indicating the time slot structure may be configured separately or unitedly. When the PS-DCI and the DCI indicating the time slot structure are configured unitedly, the user will have a processing mode different from that according to the DCI indicating the time slot structure whether to enter into a sleep state, or whether to perform measuring, or whether to perform uplink transmission may be configured by a high layer signaling.

Each user has eight bits indicating the time slot structure and further has two unused bits. The two bits may indicate the activating situation of a BWP, or reducing of a PDCCH search space.

The PS-DCI and the DCI indicating the time slot structure may be configured unitedly. When the DCI is at a specific position such as the starting point of DRX On duration or ending of DRX Off duration, the two unused bits may be used as an agreed purpose (otherwise, the two bits are ignored).

Taking the SFI-RNTI as an example, index indicated by the two reserved bits in the SFI is further adopted to identify the energy conservation information of the user group.

Specifically: taking index=56-60 as an example, the indicated PDCCH monitoring positions are as shown in the following Table 5, and other index identifiers and identifiers for monitoring the positions of the PDCCH monitor occasions are not limited.

TABLE 5

SFI information field indication example.

| | Monitoring position of PDCCH MO | | | | | | | |
|---|---|---|---|---|---|---|---|---|
| Format | 0 | 1 | 2 | 3 | 4 | 5 | 6 | 7 |
| 56 | D | D | D | D | D | D | D | D |
| 57 | U | U | U | U | U | U | U | U |
| 58 | X | X | X | X | X | X | X | X |
| 59 | D | D | D | D | D | D | D | D |
| 60 | D | D | D | D | D | D | D | D |
| Other | | | | | | | | |

| | Monitoring position of PDCCH MO | | | | | |
|---|---|---|---|---|---|---|
| Format | 8 | 9 | 10 | 11 | 12 | 13 |
| 56 | D | D | D | D | D | D |
| 57 | U | U | U | U | U | U |
| 58 | X | X | X | X | X | X |
| 59 | D | D | D | D | D | X |
| 60 | D | D | D | D | X | X |
| Other | | | | | | |

In the above Table 5 and in SFI index 56-255, X and U may represent skipping monitoring of the PDCCH, D and X may represent monitoring of the PDCCH, and other indication methods are not repeated herein.

Taking the SFI-RNTI as an example, bit field reinterpretation of 0-55 index in the SFI may further be adopted to identify the energy conservation information of the user group.

Specifically, the bit field reinterpretation may adopt X and U to represent skipping monitoring of the PDCCH, and adopt D and X to represent monitoring of the PDCCH, and other indication methods are not repeated herein.

The base station may configure interpretation of SFI index with different meanings through at least one of the following indications: an indication to configure the SFI index with the different meanings to different search spaces (SS) to distinguish the meanings of the SFI index, or an indication to configure different SFI PDCCH monitor occasion modes; and other indication methods are not repeated herein.

Step 3: the base station sends DCI which carries the energy conservation information.

At a terminal side.

Embodiment 3: new group-common DCI is defined to indicate at least one piece of energy conservation information of at least one UE.

Step 1: the UE obtains user group information.

Specifically, this step is the same as step 1 in embodiment 1.

Step 2: the UE obtains at least one of the parameter of energy conservation information field of PS-DCI or the PDCCH parameter.

Specifically, this step is the same as step 2 in embodiment 1.

Step 3: the UE receives DCI which carries the energy conservation information.

Specifically, this step is the same as step 3 in embodiment 1.

Embodiment 4: SFI group-common DCI is defined to indicate at least one piece of energy conservation information of at least one UE.

Step 1: the UE obtains user group information.

Specifically, this step is the same as step 1 in embodiment 2.

Step 2: the UE obtains at least one of the parameter of the energy conservation information field of PS-DCI or the PDCCH parameter.

Specifically, this step is the same as step 2 in embodiment 2.

Step 3: the UE receives DCI which carries the energy conservation information.

Specifically, this step is the same as step 3 in embodiment 2.

Figure 3:
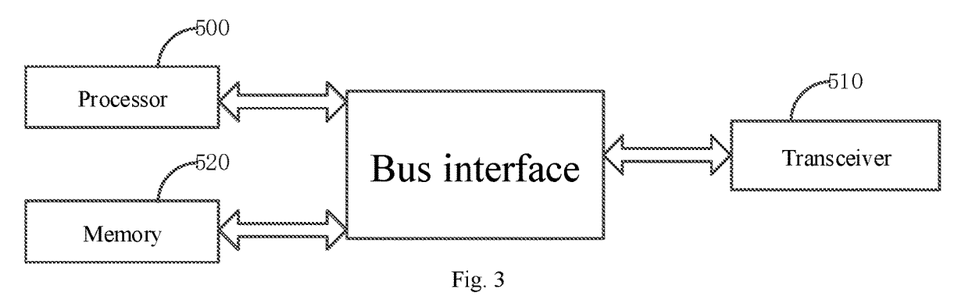
FIG. 3 is a schematic structural diagram of an apparatus for sending downlink control information at a network side provided by an embodiment of the present application.

At a network side, referring to FIG. 3, an apparatus for sending downlink control information provided by an embodiment of the present application includes:
 a memory 520, configured to store a program instruction; and
 a processor 500, configured to call the program instruction stored in the memory, and execute according to an obtained program:
  determining UE group-common DCI, where the group-common DCI is used for indicating energy conservation information of at least one UE; and
  sending the group-common DCI to the at least one UE.

In one embodiment, the energy conservation information includes one or a combination of following contents:
 whether to wake up to monitor a PDCCH;
 whether to be dormant and not monitor the PDCCH;
 whether to monitor F PDCCH time cells, where F is a positive integer greater than or equal to 1;
 whether to skip monitoring of G PDCCH time cells, where G is a positive integer greater than or equal to 1;
 whether to switch a BWP;
 whether to activate or deactivate a carrier;
 whether to configure a dormant secondary cell;
 whether to configure a DRX parameter set;
 whether to configure PDCCH decoding energy conservation information;
 whether to configure an RRM energy conservation function; and
 whether to trigger at least one of reference signal sending or relevant measurement information reporting.

In one embodiment, for different UEs or UE groups, the energy conservation information is configured respectively.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or a corresponding UE group corresponding to the bits.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI; DCI which carries the energy conservation information and is indicated by the SFI-RNTI is SFI-DCI; and the SFI-DCI is indicated based on an SFI DCI reserved bit, or indicated based on a bit used by SFI.

A transceiver 510 is configured to receive and send data under control of the processor 500.

In FIG. 3, a bus architecture may include any number of interconnected buses and bridges, which are specifically linked together through one or more processors represented by the processor 500 and various circuits of the memory represented by the memory 520. The bus architecture may further link various other circuits such as a peripheral device, a voltage stabilizer and a power management circuit together, which are all known in the art, and therefore are not further described herein. A bus interface provides an interface. The transceiver 510 may be a plurality of components, namely, the transceiver may include a transmitter and a receiver, and provide a device configured to be in communication with various other apparatuses on a transmission medium. The processor 500 is in charge of management of the bus architecture and usual processing, and the memory 520 may store data used by the processor 500 during operation execution.

The processor 500 may be a central processing unit (CPU), an application specific integrated circuit (ASIC), a field-programmable gate array (FPGA) or a complex programmable logic device (CPLD).

Figure 4:
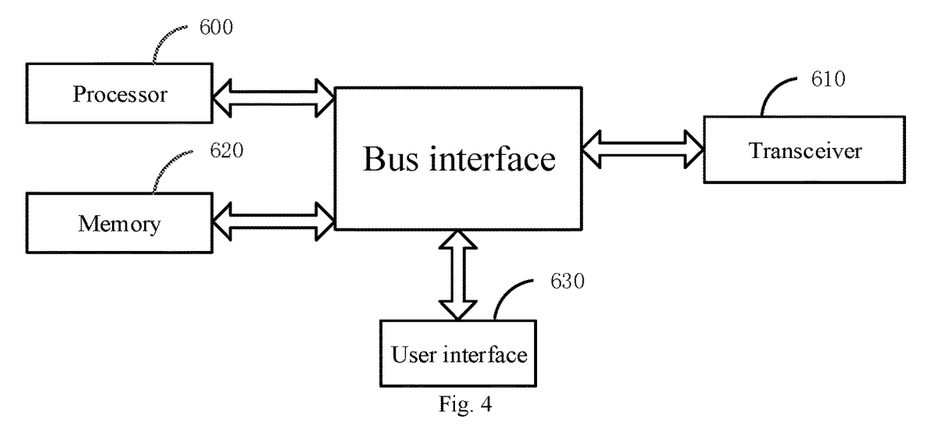
FIG. 4 is a schematic structural diagram of an apparatus for processing downlink control information at a terminal side provided by an embodiment of the present application.

At a terminal side, referring to FIG. 4, an apparatus for processing downlink control information provided by an embodiment of the present application, includes:
 a memory 620, configured to store a program instruction; and
 a processor 600, configured to call the program instruction stored in the memory, and execute according to an obtained program:
  receiving UE group-common DCI; and obtaining energy conservation information from the group-common DCI and performing corresponding processing according to the energy conservation information.

In one embodiment, the energy conservation information includes one or a combination of following contents:
whether to wake up to monitor a PDCCH;
whether to be dormant and not monitor the PDCCH;
whether to monitor F PDCCH time cells, where F is a positive integer greater than or equal to 1;
whether to skip monitoring of G PDCCH time cells, where G is a positive integer greater than or equal to 1;
whether to switch a BWP;
whether to activate or deactivate a carrier;
whether to configure a dormant secondary cell;
whether to configure a DRX parameter set;
whether to configure PDCCH decoding energy conservation information;
whether to configure an RRM energy conservation function; and
whether to trigger at least one of reference signal sending or relevant measurement information reporting.

In one embodiment, the group-common DCI includes the energy conservation information corresponding to M quantity of UEs or UE groups, where M is a positive integer greater than or equal to 1. The energy conservation information corresponding to each UE group includes N bits, where N is a positive integer greater than or equal to 1.

In one embodiment, the bits are used for identifying the energy conservation information of a UE of a corresponding UE group or a corresponding UE group corresponding to the bits.

The time corresponding to the bits, for example, may be an acting interval of group-common DCI determined according to standard convention. The specific implementations may be various and are determined according to actual needs, which is not limited in the embodiments of the present application.

In one embodiment, a format of the group-common DCI is scrambled through at least one RNTI.

In one embodiment, the RNTI is a newly-defined RNTI or multiplexing of an existing RNTI.

In one embodiment, the existing RNTI is an SFI-RNTI; DCI which carries the energy conservation information and is indicated by the SFI-RNTI is SFI-DCI; and the SFI-DCI is indicated based on an SFI DCI reserved bit, or indicated based on a bit used by SFI.

A transceiver 610 is configured to receive and send data under control of the processor 600.

In FIG. 4, a bus architecture may include any number of interconnected buses and bridges, which are specifically linked together through one or more processors represented by the processor 600 and various circuits of the memory represented by the memory 620. The bus architecture may further link various other circuits such as a peripheral device, a voltage stabilizer and a power management circuit together, which are all known in the art, and therefore are not further described herein. A bus interface provides an interface. The transceiver 610 may be a plurality of components, namely, the transceiver may include a transmitter and a receiver, and provide a device configured to be in communication with various other apparatuses on a transmission medium. Aiming at different user equipment, a user interface 630 may further be an interface capable of being externally connected and internally connected to required devices, and the connected devices include, but not limited to a keypad, a displayer, a loudspeaker, a microphone, a joystick and so on.

The processor 600 is in charge of management of the bus architecture and usual processing, and the memory 620 may store data used by the processor 600 during operation execution.

In one embodiment, the processor 600 may be a CPU, an ASIC, an FPGA) or a CPLD.

Figure 5:
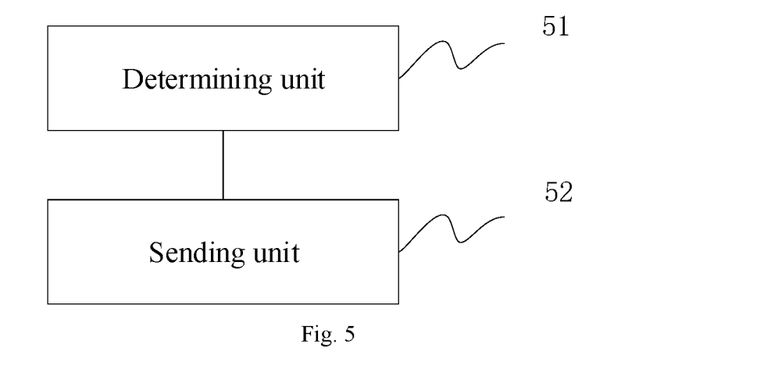
FIG. 5 is a schematic structural diagram of another apparatus for sending downlink control information at a network side provided by an embodiment of the present application.

At a network side, referring to FIG. 5, another apparatus for sending downlink control information provided by an embodiment of the present application, includes:
a determining device 51, configured to determine UE group-common DCI, where the group-common DCI is used for indicating energy conservation information of at least one UE; and
a sending device 52, configured to send the group-common DCI to the at least one UE.

Figure 6:
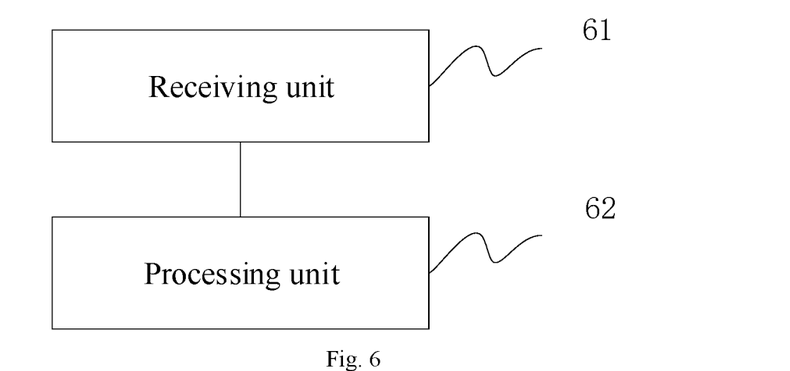
FIG. 6 is a schematic structural diagram of another apparatus for processing downlink control information at a terminal side provided by an embodiment of the present application.

At a terminal side, referring to FIG. 6, another apparatus for processing downlink control information provided by an embodiment of the present application, includes:
a receiving device 61, configured to receive UE group-common DCI; and
a processing device 62, configured to obtain energy conservation information from the group-common DCI and perform corresponding processing according to the energy conservation information.

It should be noted that dividing of devices in the embodiments of the present application is schematic and only a kind of logical function dividing, and there may be other dividing modes in actual implementation. In addition, all functional devices in all the embodiments of the present application may be integrated in one processing device, or all the devices exist independently and physically, or the two or more devices are integrated in one device. The above integrated device may be implemented in a hardware form or in a software function device form.

The integrated device may be stored in a computer readable storage medium when being implemented in the software function device form and serving as an independent product to be sold or used. Based on this understanding, the embodiment of the present application essentially, or parts contributing to the prior art, or all or parts of the solutions may be embodied in a software product form. A computer software product is stored in a storage medium, and includes a plurality of instructions used to cause a computer device (may be a personal computer, a server, a network device and so on) or a processor to execute all or parts of the steps of the methods in all the embodiments of the present application. The aforementioned storage mediums include: various mediums to store program codes, such as a U disk, a mobile hard disk, a read-only memory (ROM), a random access memory (RAM), a diskette or an optical disk.

An embodiment of the present application provides a computing device. The computing device may specifically be a desktop computer, a portable computer, a smart phone, a tablet computer, a PDA and so on. The computing device may include a CPU, a memory, an input/output device and so on; the input device may include a keyboard, a mouse, a touch screen and so on; and the output device may include a display device, such as a liquid crystal display (LCD) and a cathode ray tube (CRT).

The memory may include the ROM and the RAM, and provides program instructions and data stored in the memory to the processor. In the embodiment of the present application, the memory may be used to store a program of any method provided by the embodiments of the present application.

The processor is used to execute any method provided by the embodiments of the present application according to the obtained program instructions by calling the program instructions stored in the memory.

An embodiment of the present application provides a computer storage medium, used to store computer program instructions used by the apparatuses provided by the embodiments of the present application. The computer program instructions include programs used to execute any method provided by the embodiments of the present application.

The computer storage medium may be any available mediums or a data storage device capable of being accessed by a computer, including but not limited to a magnetic memory (such as a floppy disk, a hard disk, a magnetic tape, a magnetic optical (MO) and so on), an optical memory (such as a CD, a DVD, a BD, an HVD, and so on), and a semiconductor memory (such as a ROM, an EPROM, an EEPROM, a nonvolatile memory (NAND FLASH) and a solid state disk (SSD)), and so on.

The methods provided by the embodiments of the present application may be applied to a terminal device or a network device.

The terminal device may also be referred to as the UE, a mobile station (MS), a mobile terminal and so on. In one embodiment, the terminal may have the capability of being in communication with one or more core networks through a RAN. For example, the terminal may be a mobile telephone (or referred to as a "cellular" telephone), or a computer having the mobile nature, for example, the terminal may further be a portable mobile apparatus, a pocket mobile apparatus, a handheld mobile apparatus, a computer built-in mobile apparatus or a vehicle-mounted mobile apparatus.

The network device may be a base station (for example, an access point), referring to a device in communication with a radio terminal on an air interface in an access network through one or more sectors. The base station may be used to perform interconversion on a received air frame and IP grouping and serve as a router between the radio terminal and the rest part of the access network, where the rest part of the access network may include an IP network. The base station can further coordinate attribute management on the air interface. For example, the base station may be a BTS in GSM or CDMA, or a base station (NodeB) in WCDMA, or an evolutional base station (NodeB or eNB or e-NodeB) in an LTE, or a gNB in a 5G system, and so on, which is not limited in the embodiments of the present application.

The processing flow of the methods may be implemented through a software program. The software program may be stored in the storage medium. The above method steps are executed when the stored software program is called.

The embodiments of the present application may be provided as methods, systems or computer program products. Therefore, the present application may adopt forms of full hardware embodiments, full software embodiments, or embodiments combining software and hardware. Moreover, the present application may adopt a form of the computer program products implemented on one or more computer available storage mediums (including but not limited to a disk memory, an optical memory and the like) containing computer available program codes.

The present application is described with reference to flow charts and/or block diagrams of the methods, the devices (systems), and the computer program products according to the embodiments of the present application. It should be understood that each flow and/or block in the flow charts and/or the block diagrams and combinations of the flows and/or the blocks in the flow charts and/or the block diagrams may be implemented by computer program instructions. The computer program instructions may be provided to a processor of a general-purpose computer, a special-purpose computer, an embedded processing machine or other programmable data processing devices, generating a machine, and the instructions, when executed by the processor of the computers or other programmable data processing devices, generate an apparatus for implementing functions specified in one or more flows in the flow charts and/or one or more blocks in the block diagrams.

The computer program instructions may also be stored in a computer readable memory which can guide the computers or other programmable data processing devices to work in a specific mode, thus the instructions stored in the computer readable memory generates an article of manufacture that includes a command apparatus; where the command apparatus implements the functions specified in one or more flows in the flow charts and/or one or more blocks in the block diagrams.

The computer program instructions may also be loaded to the computers or other programmable data processing devices, so that a series of operating steps may be executed on the computers or other programmable devices to generate computer-implemented processing, such that the instructions executed on the computers or other programmable devices provide steps for implementing the functions specified in one or more flows in the flow charts and/or one or more blocks in the block diagrams.

What is claimed is:

1. A method for sending downlink control information, comprising:

determining user equipment (UE) group-common downlink control information (DCI), wherein the group-common DCI is used for indicating energy conservation information of at least one UE; and sending the group-common DCI to the at least one UE;

wherein the group-common DCI comprises the energy conservation information corresponding to M quantity of UEs or a UE group, and M is a positive integer greater than or equal to 1; and the energy conservation information corresponding to each UE of the M quantity of UEs or each UE of the VE group comprises N bits, and N is a positive integer greater than or equal to 1;

wherein the energy conservation information comprises one or a combination of following contents:

whether to wake up to monitor a physical downlink control channel (PDCCH), whether to be dormant and not monitor the PDCCH;

whether to monitor F PDCCH time cells, wherein F is a positive integer greater than or equal to 1;

whether to skip monitoring of G PDCCH time cells, wherein G is a positive integer greater than or equal to 1;

whether to switch a bandwidth part (BWP), whether to activate or deactivate a carrier;

whether to configure a dormant secondary cell;

whether to configure a discontinuous reception (DRX) parameter set:

whether to configure PDCCH decoding energy conservation information, and whether to trigger at least one of reference signal sending or relevant measurement information reporting; and wherein a format of the group common DCI is scrambled through at least one radio network temporary identity (RNTI).

2. The method according to claim 1, wherein for different UEs or UE groups, the energy conservation information is configured respectively.

3. The method according to claim 1, wherein the bits are used for identifying the energy conservation information of a UE of a corresponding UE group or a corresponding UE group corresponding to the bits.

4. The method according to claim 1, wherein the RNTI is a newly-defined RNTI or multiplexing of an existing RNTI.

5. The method according to claim 4, wherein the existing RNTI is a slot format indication radio network temporary identity (SFI-RNTI);
DCI which carries the energy conservation information and is indicated by the SFI-RNTI is SFI-DCI; and
the SFI-DCI is indicated based on an SFI DCI reserved bit, or indicated based on a bit used by SFI.

6. A method for processing downlink control information, comprising:
receiving user equipment (UE) group-common downlink control information (DCI); and
obtaining energy conservation information from the group-common DCI and performing corresponding processing according to the energy conservation information;
wherein the group-common DCI comprises the energy conservation information corresponding to M quantity of UEs or a UE group, and M is a positive integer greater than or equal to 1; and
the energy conservation information corresponding to each UE of the M quantity of UEs or each UE of the VE group comprises N bits, and N is a positive integer greater than or equal to 1;
wherein the energy conservation information comprises one or a combination of following contents:
whether to wake up to monitor a physical downlink control channel (PDCCH),
whether to be dormant and not monitor the PDCCH;
whether to monitor F PDCCH time cells, wherein F is a positive integer greater than or equal to 1;
whether to skip monitoring of G PDCCH time cells, wherein G is a positive integer greater than or equal to 1;
whether to switch a bandwidth part (BWP),
whether to activate or deactivate a carrier;
whether to configure a dormant secondary cell:
whether to configure a discontinuous reception (DRX) parameter set:
whether to configure PDCCH decoding energy conservation information, and
whether to trigger at least one of reference signal sending or relevant measurement information reporting; and
wherein a format of the group-common DCI is scrambled through at least one radio network temporary identity (RNTI).

7. The method according to claim 6, wherein the bits are used for identifying the energy conservation information of a UE of a corresponding UE group or a corresponding UE group corresponding to the bits.

8. The method according to claim 6,
wherein the RNTI is a newly-defined RNTI or multiplexing of an existing RNTI.

9. The method according to claim 8, wherein the existing RNTI is a slot format indication radio network temporary identity (SFI-RNTI);
DCI which carries the energy conservation information and is indicated by the SFI-RNTI is SFI-DCI; and
the SFI-DCI is indicated based on an SFI DCI reserved bit, or indicated based on a bit used by SFI.

10. An apparatus for sending downlink control information, comprising:
a memory, configured to store a program instruction; and
a processor, configured to call the program instruction stored in the memory, and execute according to an obtained program:
determining user equipment (UE) group-common downlink control information (DCI), wherein the group-common DCI is used for indicating energy conservation information of at least one UE; and
sending the group-common DCI to the at least one UE;
wherein the group-common DCI comprises the energy conservation information corresponding to M quantity of UEs or a UE group, and M is a positive integer greater than or equal to 1; and
the energy conservation information corresponding to each UE of the M quantity of UEs or each UE of the VE group comprises N bits, and N is a positive integer greater than or equal to 1;
wherein the energy conservation information comprises one or a combination of following contents:
whether to wake up to monitor a physical downlink control channel (PDCCH),
whether to be dormant and not monitor the PDCCH,
whether to monitor F PDCCH time cells, wherein F is a positive integer greater than or equal to 1;
whether to skip monitoring of G PDCCH time cells, wherein G is a positive integer greater than or equal to 1:
whether to switch a bandwidth part (BWP),
whether to activate or deactivate a carrier;
whether to configure a dormant secondary cell;
whether to configure a discontinuous reception (DRX) parameter set:
whether to configure PDCCH decoding energy conservation information, and
whether to trigger at least one of reference signal sending or relevant measurement information reporting; and
wherein a format of the group-common DCI is scrambled through at least one radio network temporary identity (RNTI).

11. The apparatus according to claim 10, wherein for different UEs or UE groups, the energy conservation information is configured respectively.

12. The apparatus according to claim 10, wherein the bits are used for identifying the energy conservation information of a UE of a corresponding UE group or a corresponding UE group corresponding to the bits.

13. The apparatus according to claim 10,
wherein the RNTI is a newly-defined RNTI or multiplexing of an existing RNTI.

14. An apparatus for processing downlink control information, comprising:
a memory, configured to store a program instruction; and
a processor, configured to call the program instruction stored in the memory, and execute the method according to claim 6 according to an obtained program.

* * * * *